Jan. 13, 1942. U. LIDDEL ET AL 2,269,674
METHOD FOR PHOTOMETRIC ANALYSIS
Filed Aug. 22, 1939 4 Sheets-Sheet 1

INVENTOR.
URNER LIDDEL,
BY ROBERT BOWLING BARNES,
Robert Ames Norton
ATTORNEY.

UNITED STATES PATENT OFFICE 2,269,674

METHOD FOR PHOTOMETRIC ANALYSIS

Urner Liddel, Greenwich, and Robert Bowling Barnes, Stamford, Conn., assignors to American Cyanamid Company, New York, N. Y., a corporation of Maine Application August 22, 1939, Serial No. 291,298

5 Claims. (Cl. 250—43)

This invention relates to the control of chemical reactions and processes in which a mixture of chemical compounds is produced, by means of infrared absorption or emission of one of the components or products produced. More particularly the invention is directed to a method utilizing uni-directional radiation detectors with optical amplification and actuation of control devices by the energy obtained from the optical amplification.

Many chemical reactions produce mixtures containing varying amounts of a desired reaction product and other processes more purely physical in nature also result in producing mixtures in which one or more chemical compounds occur in varying amounts. Examples of such processes are most chemical reactions, distillations of mixtures of chemical compounds, combustions in furnaces, exhaust gases produced from many processes, as for example, exhaust gas containing $H_2S$, $CO_2$, $SO_2$ and the like in varying amounts.

It is often desirable to control, automatically, processes involving the production of mixtures of chemical compounds in order to retain certain desired conditions or to prevent formation of undue amounts of chemical constituents. Thus, for example, in the catalytic process for the production of hydrocyanic acid from paraffin hydrocarbons and ammonia, it is desirable to keep the percentage of HCN above a certain figure. Again, in the combustion of fuel, it is usually desirable to maintain a certain concentration of $CO_2$ in the combustion or stack gases. In the first case, an amount of HCN greater than the set amount does no harm and it is only necessary to control the reaction so the production does not drop below a certain figure. A further illustration of the first type of cases is the stack gas from a contact sulfuric acid plant. Here the content of $SO_2$ should not exceed a certain low figure. In the second case of combustion, there can be too much $CO_2$ as well as too little.

Many chemical compounds exhibit spectra in the infrared which are characterized by sharp and relatively intense absorption bands when infrared radiation is passed through the cold compound and correspondingly sharp emission peaks where the compound in the form of a gas is at a temperature at which it emits freely in the infrared. The present invention may operate on either absorption or emission, but in the majority of cases, absorption is utilized because there are more processes resulting in mixtures of chemical compounds below the emission temperature than above.

In the present case infrared radiation is used to designate electromagnetic waves of frequency lower than the lowest frequency waves of the visible spectrum and higher than high frequency radio waves. It should be understood that the term is not used in any different or broader sense either in the specification or in the claims.

The present invention may be divided into two species; the first depending on absorption of a given chemical compound and the second on emission. In the first case a relatively steady source of monochromatic infrared radiation, that is to say, radiation in a very narrow predetermined band of the infrared is passing through a suitable sample holder through which a portion of the mixture produced in a given process is continuously or semi-continuously passed. The beam, reduced in intensity by the absorption at the particular frequency in the sample, is then directed on, preferably focused on, a suitable infrared radiation detector which either directly or through the interposition of an electric galvanometer, results in the rotation of a mirror. A source of relatively intense visible radiation is directed on the mirror and the reflected beam moves through the same angle through which the mirror is rotated. At a suitable distance from the mirror is located one or a series of photoelectric relays, for example, ordinary photo-cells. When the rotation of the mirror is such to cause the beam to strike a given photocell or to move away from a given photocell, the cells operate relays which are capable of controlling large currents of electric energy either directly or through interposition of further relays. The electrical energy is then used to operate mechanical controls affecting the process, for example, valves, blowers, pumps, and the like, which will tend to change the output of the process to be controlled when the nature of the output is varied.

For example, in the case of contact sulfuric acid process where it is desired to maintain the concentration of $SO_2$ in the stack gases from the acid absorbed below a certain figure, a portion of these gases are circulated through the sample holder and the monochromatic infrared absorption set to a frequency corresponding to a sharp absorption band of $SO_2$. The radiation detector with accompanying rotatable mirror and arrangement of photocells is so set that when the absorption is less than that corresponding to the maximum permissible content of $SO_2$, the beam reflected from the mirror strikes or just misses a photocell. If the amount of $SO_2$ increases, the absorption increase is detected and results in a rotation of the mirror. The beam of light moves either onto the photocell or off from it, and a relay is actuated to control the reaction in the process to produce less $SO_2$, for example, a secondary air blower may be stared which will increase the amount of oxygen in the gases entering the contact sulfuric acid system and thus reduce the amount of $SO_2$ in the stack gases, or a control may be effected by decreasing the flow of burner gas into the contact sulfuric acid plant which will also effect a similar result where increased $SO_2$ results from overloading. Where it is desired, both factors can be brought into play by the same or another relay encountered by the same beam. As soon as the correcting factors have taken effect and the content of $SO_2$ has decreased with corresponding decrease of absorption, the amount of infrared radiation striking the detector is increased, and the mirror is turned until the reflected beam no longer strikes the photocell, whereupon the correcting controls cease to operate. In such a manner a contact sulfuric acid plant can be automatically controlled. It should be noted that in the above case the only concern is to keep the amount of $SO_2$ below a certain figure. If the $SO_2$ drops still lower no control is effected because normally this is not an undesirable condition for effective operation of the plant.

There are other cases, however, such as the combustion of fuels, in which there is an optimum content of $CO_2$, and inefficient results are obtained if the amount of $CO_2$ increases beyond a certain amount as well as if it falls below. In such a case the infrared controller is set so that the reflected beam at optimum $CO_2$ content lies between two photoelectric relays. If the $CO_2$ content drops below the desired figure by a predetermined amount, the absorption decreases, more infrared radiation is detected, and the mirror is turned so that the reflected beam strikes a photocell to increase the amount of $CO_2$, for example, a control which increases the amount of primary or secondary air to the combustion furnace. When the amount of $CO_2$ then increases, the beam will leave the photocell, and all controls will stop operating, but if the $CO_2$ content continues to increase, the beam will be turned further and will strike a second relay which will operate the controls to counteract this factor, for example, to decrease the amount of air fed to the furnace.

Usually combustion when measured by $CO_2$ content, requires an analysis of stack gases, that is, the gases below incandescence. In such a case, a sample of the stack gas is continually passed through the absorption cell in the infrared controller. In some cases, the conditions of the flame itself may be of interest rather than the condition of the stack gases. In this case an emission peak corresponding to the absorption peak for $CO_2$ may be employed and instead of passing a portion of stack gases through an absorption infrared controller, no absorber is used, and a portion of the flame itself is used as a source of infrared radiation. The operation of the process of the present invention is of course the same, only that now the movement of the beam reflected by the mirror actuated by the detector, will be exactly opposite as increased $CO_2$ will result in increased infrared radiation instead of decreased.

An example of the use of the present process in controlling a physical process is a still for the distillation of sulfate turpentine. As a batch is distilled, the vapors vary in their relative content of alpha- and beta-pinene. It is desirable to collect in different fractions, products rich in one or the other. In this case, a portion of the vapors from the still or condensate is passed through the absorber of the infrared controller of the present invention, and the mirror and photocells are so set that when the amount of the two constituents having a sharp absorption band at the selected monochromatic infrared radiation increases beyond a certain point, the movement of the beam will actuate a photo relay which will turn a valve directing the condensate into a different receiver.

The present invention is not concerned with the particular design of sources of monochromatic infrared radiation, but is applicable to any of the ordinary types which are employed, some of which are illustrated in the drawings, nor is any particular type of radiation detector and optical amplifier essential to the invention. It is an advantage of the present invention that it can be used with any of the known types of infrared detectors, for example, thermocouples, bolometers, and the like. These detectors result in the production of electromotive force or in the variation of current, and require some type of current indicating instrument similar to a galvanometer. The present invention can utilize typical thermocouples with externally connected galvanometers, composite thermocouple galvanometers in which the thermo elements form a part of the galvanometer coil mechanism, and the like. In each case the detector of infrared radiation finally results in a rotational movement of a mirror by means of which a relatively high energy light beam can be moved resulting in an enormous amplification of energy. While most of the common types of infrared radiation detectors utilize an electric measuring instrument, it is not necessary to the present invention that there be interposed any electric circuit, and torsion radiometers may be used in which the radiometer vanes twist a quartz fiber which in turn moves a mirror, without the interposition of any electrical elements. The moving mirror can be used for optical amplification just as effectively as in the more common type of detectors in which an electric circuit is employed. Other types of suitable detectors of infrared radiation may be used so long as they are capable of effecting movement of a reflecting surface, and it is an advantage of the present invention that it is applicable to all the ordinary types of uni-directional infrared radiation detectors.

For extremely low variations in infrared radiation, there has been developed a resonance detector which employs a galvanometer of highly resonant mechanical construction. Instead of employing a steady electric potential to the galvanometer coil as is obtained in other infrared detectors, the infrared radiation is interrupted at the galvanometer resonance frequency so that the detector receives pulses of infrared energy at the frequency of galvanometer resonance. This results in the galvanometer coil swinging through an angle much larger than that corresponding to the deflection caused by a steady radiation of the same energy. In such a case the amplified light beam oscillates through a certain angle and photocells can be placed just outside this angle so that if the infrared energy becomes greater, the swing of the beam from the galvanometer will strike these photocells at each extremity of its swing. Suitable delay mechanisms are introduced in the photocell relays so that they will give a continuous response when illuminated at each swing of the galvanometer.

Single detectors such as those which have been previously described above operate effectively under suitable conditions and it is an advantage of the present invention that it can be used with the less complex infrared optical systems. However, any infrared detector of uni-directional nature is open to certain inherent inaccuracies, such as variations in the output of the source of infrared radiation, and to a lesser degree in the case of thermal detectors of the thermocouple and bolometer type, to the variations in the environment surrounding the detector. In many cases the limits of tolerance for the control of the chemical processes are such that these variations are not sufficient to interfere with the automatic functioning of the process of the present invention. In such cases the relatively simple types using single uni-directional detectors can be employed. In some cases it is desired to have greater accuracy and then a somewhat more complex modification of the present invention is applicable. In this modification, two beams from the same infrared radiator are caused to travel different paths and are finally impressed on two detectors such as two thermocouples which are arranged in opposite phase, the output of the two detectors moving a null point galvanometer. One of the beams passes through an absorber and the other beam passes through a device for intensity variations, such for example, as an iris diaphragm or other suitable device for decreasing the intensity of the beam. The null point galvanometer can be set for a certain absorption value to cause the reflected beam to stay between two photocells and movements to either side will actuate a photocell which can operate a motor or other driving source to vary the diaphragm in order to bring about a balance. The driving mechanism or the impulses which actuate it can in turn be caused to operate a process control. The null method permits a continuous adjustment of process control to a certain point and is somewhat more accurate than the on and off type of device which is actuated by a single uni-directional detector. Another advantage of the null point method is that it is very easy to combine with the control of the process a recorder driven by the same mechanism which will make a record of the variations of the process with time. The particular construction of such recording device forms no part of the present invention and any suitable type may be used.

The invention will be described in greater detail in conjunction with the drawings which illustrate typical diagrammatic and semidiagrammatic arrangements of processes controlled by the present invention.

Figure 1:
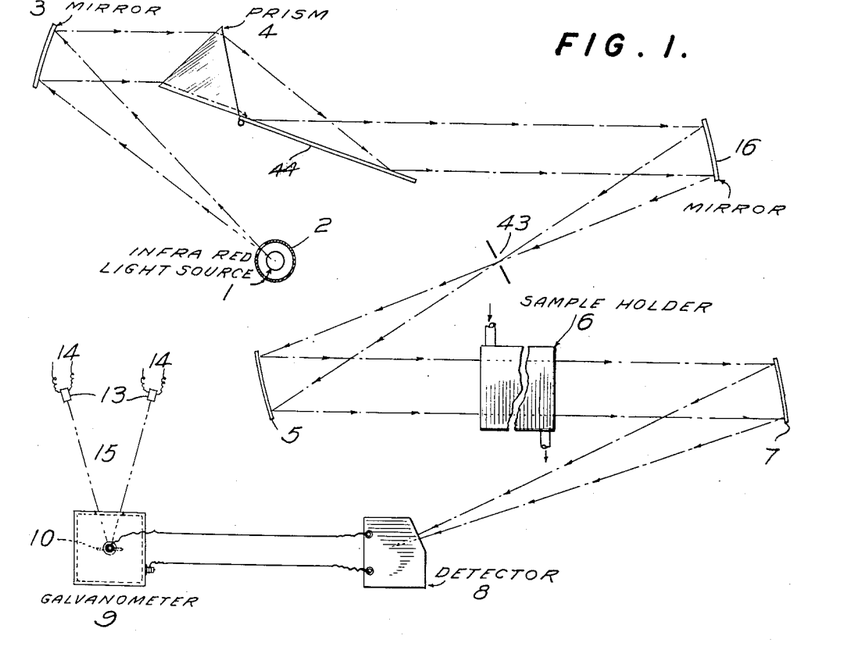
Fig. 1 is a diagrammatic representation of a uni-directional absorption control using a dispersing prism to produce the monochromatic infrared radiation.

In Figs. 1 to 5 like parts bear the same reference numerals. In Fig. 1 an infrared source 1 in a suitable casing 2 giving a narrow beam aperture radiates an infrared beam onto the curved mirror 3 which produces a parallel beam which passes through the prism 4 and into a mirror 44 which is pivoted about one edge which may be of rock salt, quartz, or other dispersing material depending on the range in the infrared in which the chosen monochromatic band is to be located, the beam is then focused by a curved mirror 16 on a slit 43, the mirror 16 being pivoted so that the portion of the prism focused on the slit 43 is that containing the chosen band of radiation, and the chosen band is reflected by the mirror 5 through the sample holder 6 through which a continuous or periodic sample of the vapors or fluids produced by a chemical process are caused to flow. The frequency of the infrared chosen is one at which one of the components of the mixture shows a sharp absorption band. The beam after passing through the sample holder 6 is of diminished intensity depending on the concentration of the component exhibiting the sharp absorption band, and is then focused onto an infrared detector 8 of ordinary type, such as a thermocouple, a bolometer, or the like. The electric output of the detector passes through a galvanometer device shown at 9 which results in rotation of a mirror 10 which in turn reflects an intense beam of light from the source 1 onto a surface 2 on which is located one or more photocells 13. These photocells actuate electric relays to control the process in a sense to counteract the increase in the amount of the constituent showing he sharp absorption band. The operation of the controls of the process is purely conventional; photocell relays 13 taking the place of ordinary push-button controls of standard type. For this reason the controls are not shown in the drawing but the wires are illustrated as going from the photocells to the ordinary type of electric control. When the amount of the constituent having the sharp absorption band increases beyond a predetermined point, the detector 8 detects less energy, the galvanometer 9 rotates the rirror 10, and the reflected beam 15 assumes the position shown in dotted lines striking the left-hand photocell 13. This actuates a control to bring about a variation in the process in the sample of producing less of the component with the high absorption. When the control has had sufficient effect so that the concentration in the sample holder drops, the absorption decreases, the amount of infrared radiation increases, and the mirror 10 moves the beam off the left-hand photocell into the central position. The control then ceases to operate. If an amount of the constituent with the sharp absorption band drops still further, the absorption decreases, the galvanometer mirror 10 moves still further, and the beam 15 occupies the position shown in dashed lines, striking the right-hand photocell 13. This photocell can actuate relays to operate controls in the reverse direction. If the process is of such a nature that is a matter of no concern if the concentration of the component with the sharp absorption band drops below a certain point, the right-hand photocell can be omitted. Similarly, if it is immaterial how high the concentration goes, but it is desired to keep it above a certain predetermined minimum, the left-hand photocell 13 may be dispensed with.

Figure 2:
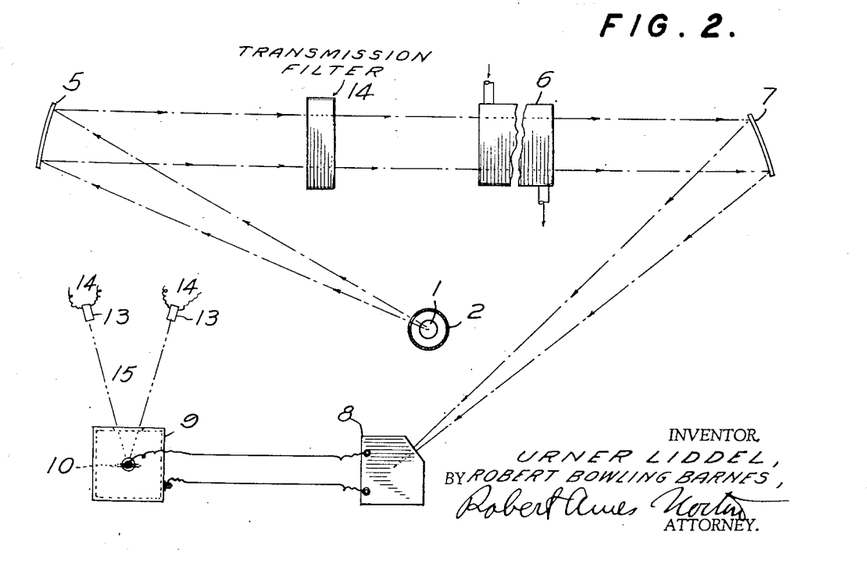
Fig. 2 is a similar diagrammatic representation of a system utilizing a transmission filter to produce monochromatic infrared radiation.

In Fig. 2 the arrangement is similar to that in Fig. 1 except that instead of the prism 4, a transmission filter 14 is used to produce monochromatic infrared radiation. This has the advantage of somewhat greater cheapness, but it has the disadvantage that the band is not quite so sharp and no adjustment can be made of the frequency of the monochromatic radiation as can be done in Fig. 1 by a suitable rotation of the prism 4. In other words, each band of monochromatic infrared light requires its own filter.

Figure 3:
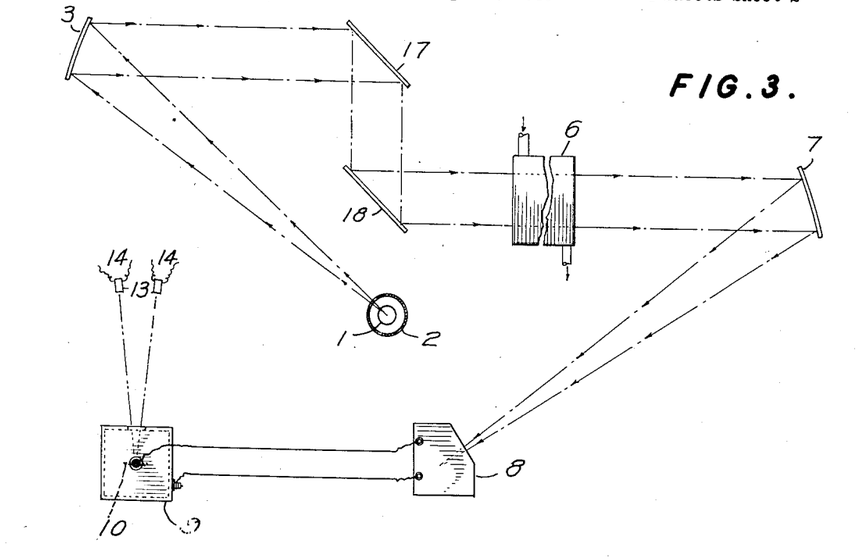
Fig. 3 is a similar diagrammatic arrangement showing monochromatic infrared light by selective reflection.

Fig. 3 is similar to Figs. 1 and 2 but monochromatic infrared radiation is obtained by reflection from the crystal surfaces 17 and 18. The operation of the device is otherwise the same.

Figure 4:
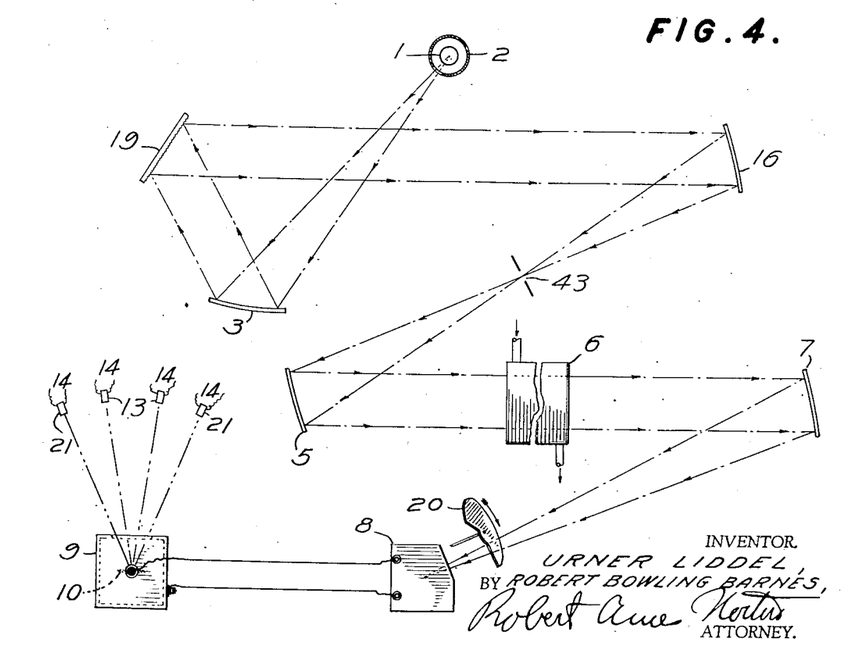
Fig. 4 is a similar diagrammatic representation of an arrangement utilizing a grating for obtaining monochromatic infrared light.

Fig. 4 shows a device employing a grating 19 to produce monochromatic infrared radiation and for many purposes this is a very desirable type of device. Gratings can be obtained cheaply, they can be used over a considerable band to select various frequencies and they permit a very compact device. In Fig. 4 the production of a parallel beam to strike the grating 19 is effected by means of curved mirror 3. This, however, may be dispensed with, and the grating 19 may be given the curved surface. Fig. 4 shows a further modification of detector using an intermittent pulsating detector with a resonance galvanometer. The infrared beam striking the detector 8 is interrupted at galvanometer resonance frequency by the interrupter disc 20 driven by a suitable synchronous source not shown. In place of the disc interrupter a pendulum interrupter or any other type capable of accurate timing may be employed. The swing of the galvanometer mirror 10, and hence, of the reflected beam 15 having given settings will be through a certain angle smaller than the angle shown by the broken lines to the two photocells 13 in the figure. The photocell relay will operate if the swing of the reflected beam from the galvanometer mirror exceeds this angle and hence strikes the photocells 13. If the absorption in the holder 6 becomes less and the energy striking the detector 8 therefore increases, the swing of the beam 15 will be through a larger angle shown in the dotted lines, and will then strike the photocells 13 at each end of its swing and the relays will be actuated. In the resonance type of detector shown in Fig. 4 a still smaller absorption which would result in a still wider swing would not affect the photocells. In other words, if two photocells only are to be used, they will serve only to keep the concentration of the component used for measuring below a certain predetermined maximum. If it is also desired to keep it above a predetermined minimum, a second set of photocells 21, outside of the photocells 13 may be located, which are encountered as the angle of oscillation of the mirror 10 increases still further. These cells can operate suitable relays throwing the relays of the cells 13 out of action, or counteract them by bringing about a control of the process to increase the amount of the component which shows the sharp absorption band.

It will be apparent that the resonance type of galvanometer introduces complications by reason of the interrupter mechanism and the fact that the number of relays to accomplish a desired result is doubled. This additional complication is, however, offset in many cases by the fact that the sensitivity of a resonance galvanometer is very much greater than an ordinary type, and it is thus possible to control the reaction within much closer limits. In every case the skilled engineer will choose the compromise giving him the most effective over-all results. He may have greater sensitivity and accuracy at the expense of greater complexity, or greater ease and cheapness at the expense of greater sensitivity. Figs. 1 to 4 show various types of detectors and various types of devices for producing monochromatic infrared radiation. It should be understood that the invention is in no sense intended to be limited to the use of a particular device for producing monochromatic radiation with a particular type of detector, for example, the prism of Fig. 1 may be used in conjunction with resonance galvanometer of Fig. 4, or the grating of Fig. 4 may be used with the ordinary galvanometer of Fig. 1.

While the detector and galvanometer have been shown separately because in the types illustrated in types 1 to 4 they are actually physically separate instruments, it should be noted that they are really a uni-functional element because they serve to transform variations in infrared radiation into rotations on a mirror. In the case of a torsion radiometer only one device is used which performs the same function without the interposition of an electric circuit. The process is, however, identical.

Figure 5:
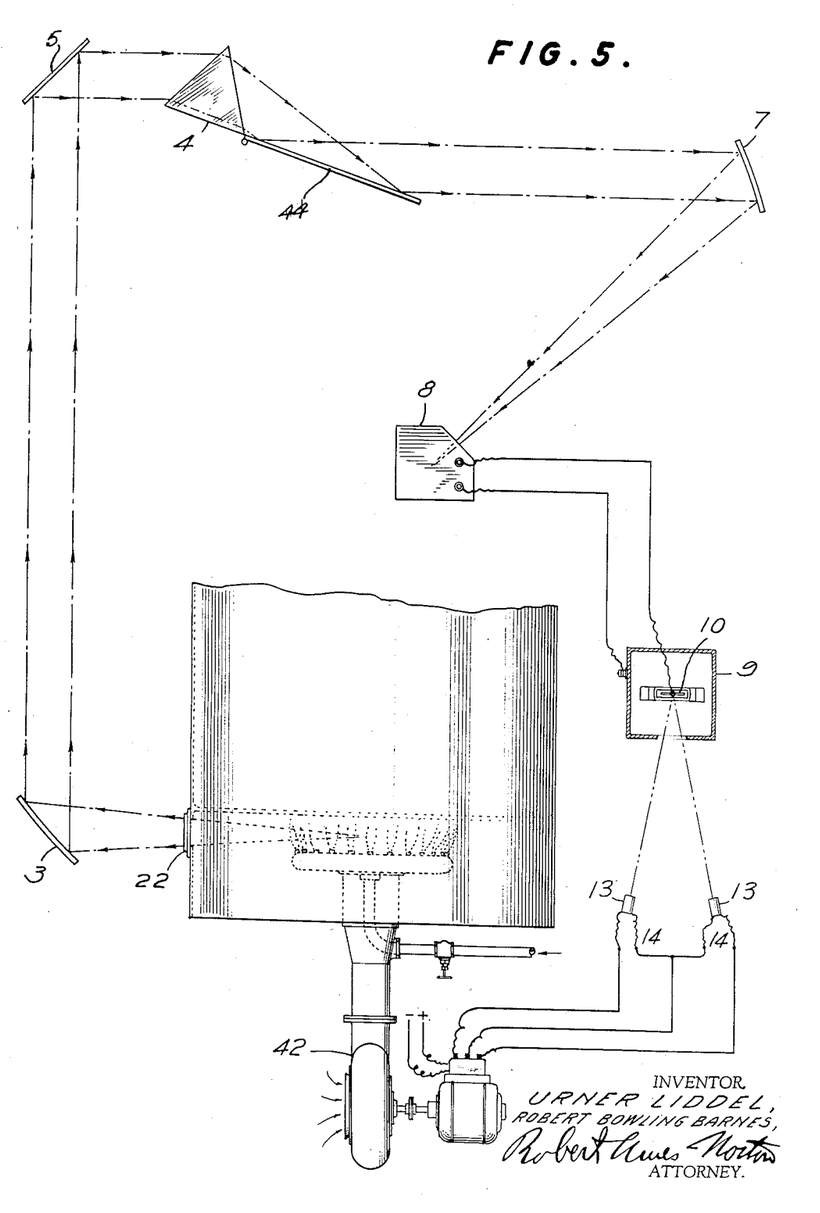
Fig. 5 is a diagrammatic representation of a system utilizing emission of an incandescent gas mixture for infrared control of the process.

Fig. 5 illustrates an arrangement using the emission band of a particular component instead of an absorption band. Here instead of the unit source of infrared radiation 1, there is substituted an opening or window 22 in a device in which there is present a mixture of incandescent gases, for example, a window permeable to infrared radiation giving a view of a flame in a combustion furnace. The radiation strikes a mirror 3 and as in the preceding figures, is passed through a suitable selector of monochromatic radiation shown as a prism 4, and mirror 5 as in Fig. 1, but the sample holder 6 is omitted because no absorption is desired. The detector 8 then receives monochromatic radiation at the frequency corresponding to the peak of emission of the component having the sharp emission peak. The operation of the detector, optical amplifier and photocells is the same as in the preceding figures, the wires from the photocells leading to a motor operated auxiliary blower 42, and the furnace is controlled so as to vary the composition of the flame to keep it at the desired conditions.

Figure 6:
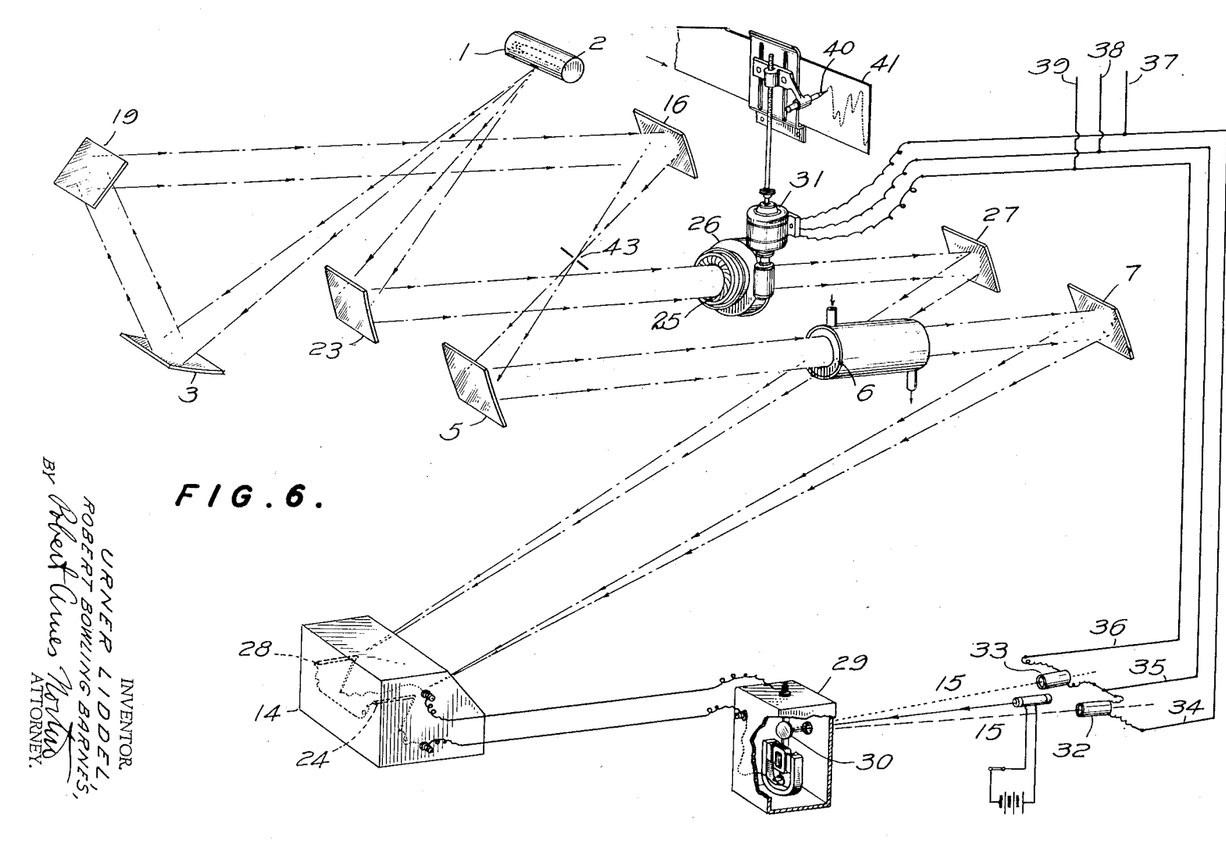
Fig. 6 is a perspective view showing a null point infrared control system.

Fig. 6 shows a null point device. Here, the radiation from the source 1 strikes two mirrors, 3 and 23. From the curved mirror 3 a parallel beam is reflected onto the grating 19. The dispersed beam is then focused by curved mirror 16 onto a slit 43 and the selected monochromatic band of infrared radiation is then transformed into a parallel beam by mirror 5 and passes through the sample holder 6 and reflected by the mirror 7 onto a detector 14, which may for example, be a thermocouple which is connected in opposite phase to a thermocouple 28, the output wires from the two leading to a null point galvanometer 29 actuating a mirror 30 from which is reflected visible beam 15 as has been described in connection with preceding figures. The other beam passes through a device 26 having a variable iris diaphragm 25 and is then focused by the curved mirror 27 onto the second thermocouple 28. Reversible motor 31 operates the iris diaphragm.

The galvanometer 29 receives a differential current from the two thermocouples 24 and 28 and at a given setting of the iris diaphragm 25 and a given concentration of the component having the absorption band in the holder 6, the output is balanced and the galvanometer mirror occupies a central position in which the beam 15 is in the position shown in the solid line between the two photocells 32 and 33. Balance can be effected either by having the thermocouples of the same type and reducing the opening of the iris diaphragm to the point where the radiation striking the two thermocouples from the two beams is the same, or the thermocouples may be of different size and sensitivity. It is an advantage of the present invention that the device can be set for a given calibration regardless of whether the thermocouples are perfectly uniform or not.

Suppose now that the amount of the component having the absorption band increases in the sample holder 6. The amount of energy striking the thermocouple 24 will then decrease whereas the energy striking the thermocouple 28 will remain constant. The thermocouple 28 will therefore generate a higher E. M. F. and will move the galvanometer mirror from its middle point until the reflected light beam occupies the position shown in dotted lines in the drawings, striking photocell 32. This photocell operates a relay closing the circuit in wires 34 and 35 which turn the motor 31 in a direction to decrease the opening of the iris diaphragm. This rotation continues until the energy in the beam striking the thermocouple 28 equals the energy in the beam striking thermocouple 24, at which time the motor stops. If the amount of the component in the holder 6 then decreases, the energy striking the thermocouple 24 will increase and the galvanometer beam will move over on the opposite side shown in dashed lines on the drawing, striking photocell 33. This closes a circuit and starts the motor operating in the opposite direction. The iris diaphragm then opens until the energy striking the two thermocouples 24 and 28 is again in balance at which time the motor stops. Control of the reaction can be effected either by driving the control mechanism from the shaft of the motor 31 or by actuating a control from the circuits of the wires 34, 35, and 36 shown diagrammatically as a branch circuit of wires 37, 38 and 39.

The arrangement shown in Fig. 6 has the additional advantage that it is not affected by variations in the emission from the source 1 because if the emission varies by a given proportion, this is the same relative proportion in both beams and will therefore not affect the reading of the galvanometer, but merely its sensitivity. Similarly, since the degree through which the iris diaphragm has to be moved is a measure of the amount of absorption, and hence concentration of the component with the absorption in sample holder 6, the shaft of the motor 31 can be caused to drive a recording pen 40 moving up and down on a recording surface 41 which is moved from right to left in proportion to time, thus giving a graph of the variation of the concentration of the desired component in sample holder 6 from time to time. The recording device is shown purely diagrammatically as any ordinary type can be used and depending on the scale of the recording surface, the drive from the shaft 31 can be linear as shown diagrammatically, or may include a drive of varying ratio, such as a cam. The present invention is not concerned with any particular design of recorder as any of the standard recording designs may be employed, for example, recorders such as those described in the patent issued to Pineo, U. S. Pat. 2,107,836.

In Fig. 6 the mirror 23 is shown as an ordinary curved mirror so that all components of infrared spectrum are to be found in the beam. As this is balanced against only a single frequency band from the grating 19, which in turn is subjected to a selective absorption in the sample holder 6, the opening of the iris diaphragm sometimes has to be very small in order to effect a balance. In some cases this may result in difficulties in mechanical construction. If desired, the beam may also be subjected to dispersion to select a narrow band of monochromatic infrared radiation in which case the iris diaphragm may be much larger. This is easily accomplished by substituting a curved grating for the mirror 23 or a curved mirror and flat grating. A further improved result is that variations in the relative amount of radiation at this frequency from the source 1 will thus cancel out because both beams select the same narrow band. These advantages are obtained, however, at the expense of a device using two gratings, which renders it more expensive as well as more sensitive. Here also, a compromise must be worked out between the complexity and sensitivity of one apparatus, and the simplicity and cheapness of another, and the apparatus chosen with due consideration to the processes involved and their control. If extreme accuracy is not necessary, the cheaper machine may be used.

In the modifications shown in Figs. 1 to 4 and 6 a monochromatic band of radiation is selected which is then passed through the sample holder. For many purposes this is the most satisfactory method of obtaining absorption measurements. However, instead of interposing the sample holder in the monochromated beam, it may be interposed into the unmonochromated infrared beam in which case a selective absorption is obtained only in the chosen band and the beam is later analysed by the monochromating means so that the chosen band alone encounters the detector. The operation of the device is exactly the same but there are certain deviations, namely that the sample holder is exposed to the full radiation of the infrared beam and not to the radiation of only one band thereto.

In the claims the terms monochromated light or beam are used in the somewhat more general sense customary in the art of practical optical apparatus. Strictly speaking, a practical apparatus does not utilize perfectly monochromatic radiation, that is to say, radiation of only a single frequency. All practical devices utilize narrow bands of wavelength and frequency which are sufficiently narrow so that for practical purposes they behave similarly to pure monochromatic light, that is to say, the band is of a width, the same order of magnitude as sharp absorption or emission peaks. The terms are used in the present specification and claims in this common sense.

We claim:

1. A recording apparatus for the recording of variations in a process producing a product having a plurality of components one of which is characterized by a strong absorption band in the infrared spectrum by transforming variations of concentration of the compounds into electric currents which comprises in combination a source of infrared radiation, means for forming a plurality of beams from said source, monochromating means in at least one of said beams, a hollow body of material transparent to the monochromatic infrared radiation located in the monochromatic beam, a detector for infrared radiation capable of transforming radiation energy into electric current, means for focusing the monochromatic beam after passing through the hollow body onto said detector, mechanically operated means for varying the intensity of the other beam, means for focusing the other beam after passing through the intensity varying means onto a second infrared radiation detector capable of transforming radiation energy into electric energy, the output of the two detectors being connected in opposite phase, a mirror galvanometer, means for causing the current from the radiation detectors to pass through said galvanometer so that the movement of the galvanometer mirror is proportional to a function of the difference in infrared energies striking the two detectors, means for impressing a beam of visible light on said reflecting surface whereby a reflected beam is produced, photosensitive controlling means located so as to be struck by the reflected beam at different energy levels on the detectors, means actuated by said photosensitive controlling means to operate the varying intensity of one of the infrared beams in a direction so as to maintain a predetermined range of energy level differentials on the detectors, and recording means actuated by said photosensitive controlling means to produce a record of variations with time of the energy of the monochromated beam after passing through the hollow body.

2. An apparatus according to claim 1, in which the recording means is mechanically driven from the means for varying the intensity of one of the infrared beams.

3. A photometric method of transforming changes in composition of a product of a process which produces a plurality of chemical compounds at least one of which is characterized by strong absorption in the infrared spectrum which comprises passing a beam of monochromatic infrared radiation corresponding to the said absorption through at least a portion of the product over a path of constant length, transforming the radiant energy of said band after passing through the product into electrical current, causing the electric current to pass through a mirror galvanometer, illuminating the mirror of the galvanometer by a beam of light whereby a reflected beam of light is obtained and positioning said beam with respect to photosensitive means capable of transforming light into electric current so that a predetermined change in the concentration of the said compound of the product will cause a deflection of the reflected beam so as to operate the photosensitive means to result in the production of an electric current therefrom.

4. An apparatus for photometric analysis of a process producing a product containing a plurality of chemical components at least one of said components possessing a strong absorption band in the infrared by transforming variations of concentration of the compounds into electric currents, comprising in combination a hollow body having an inlet and exit, said body being of material transparent to infrared radiation, means for passing a beam of monochromatic infrared radiation through said hollow body, an infrared detector located so as to receive the monochromatic beam after passing through said hollow body, said radiation detector being capable of transforming infrared radiant energy into electric current, a mirror galvanometer and means causing the electric current from said infrared radiation detector to pass through the galvanometer, means for projecting a beam of light onto the mirror of the galvanometer whereby a reflected beam is produced and photosensitive means for transforming light into electric current so located as to encounter the reflected beam at predetermined energy levels of monochromatic infrared radiation, contacting the detector.

5. An apparatus for the photometric analysis of a process producing a product containing a plurality of chemical components, one of which is characterized by a strong absorption band in the infrared spectrum by transforming variations of concentration of the compound into electric current which comprises in combination a source of infrared radiation, means for forming a plurality of beams from said source, monochromating means in at least one of said beams, a hollow body of material transparent to the monochromatic infrared radiation located in the monochromatic beam, a detector for infrared radiation capable of transforming radiation energy into electric current, means for focusing the monochromatic beam after passing through the hollow body onto said detector, mechanically operated means for varying the intensity of the other beam, means for focusing the other beam after passing through the intensity varying means onto a second infrared radiation detector capable of transforming radiation energy into electric energy, the output of the two detectors being connected in opposite phase, a mirror galvanometer, means for causing the current from the radiation detectors to pass through said galvanometer so that the movement of the galvanometer mirror is proportional to a function of the difference in infrared energies striking the two detectors, means for impressing a beam of visible light on said reflecting surface whereby a reflected beam is produced, photosensitive means capable of transforming light into electric current located so as to be struck by the reflected beam at different energy levels on the detectors, and means actuated by said photosensitive controlling means to operate the varying intensity of one of the infrared beams in a direction so as to maintain a predetermined range of energy level differentials on the detectors.

URNER LIDDEL.
ROBERT BOWLING BARNES.

CERTIFICATE OF CORRECTION.

Patent No. 2,269,674.   January 13, 1942.

URNER LIDDEL, ET AL.

It is hereby certified that error appears in the printed specification of the above numbered patent requiring correction as follows: Page 1, second column, line 16, for "passing" read --passed--; page 2, first column, line 8, for "stared" read --started--; page 3, second column, line 14, for "into" read --onto--; line 44, for "he" read --the--; line 55, for "rirror" read --mirror--; page 6, second column, line 12, claim 4, after "infrared" insert --radiation--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.